United States Patent
Jiang

(10) Patent No.: US 12,436,307 B2
(45) Date of Patent: Oct. 7, 2025

(54) METHOD AND APPARATUS FOR IMPLEMENTING A HIGH-RESOLUTION SEISMIC PSEUDO-REFLECTIVITY IMAGE

(71) Applicant: BP Corporation North America Inc., Houston, TX (US)

(72) Inventor: Li Jiang, Katy, TX (US)

(73) Assignee: BP Corporation North America Inc., Houston, TX (US)

( * ) Notice: Subject to any disclaimer, the term of this patent is extended or adjusted under 35 U.S.C. 154(b) by 480 days.

(21) Appl. No.: 17/960,186

(22) Filed: Oct. 5, 2022

(65) Prior Publication Data

US 2023/0103668 A1    Apr. 6, 2023

Related U.S. Application Data

(60) Provisional application No. 63/252,675, filed on Oct. 6, 2021.

(51) Int. Cl.
| | | |
|---|---|---|
| *G01V 1/30* | (2006.01) | |
| *G01V 1/137* | (2006.01) | |
| *G01V 1/18* | (2006.01) | |
| *G01V 1/28* | (2006.01) | |
| *G01V 1/38* | (2006.01) | |

(52) U.S. Cl.
CPC .............. *G01V 1/306* (2013.01); *G01V 1/137* (2013.01); *G01V 1/186* (2013.01); *G01V 1/282* (2013.01); *G01V 1/3843* (2013.01); *G01V 2210/1212* (2013.01); *G01V 2210/1423* (2013.01); *G01V 2210/6222* (2013.01)

(58) Field of Classification Search
CPC ........ G01V 1/306; G01V 1/137; G01V 1/186; G01V 1/282; G01V 1/3843; G01V 2210/1212; G01V 2210/1423; G01V 2210/6222
See application file for complete search history.

(56) References Cited

U.S. PATENT DOCUMENTS

| | | | |
|---|---|---|---|
| 7,542,373 B2 | 6/2009 | Wang | |
| 8,830,788 B2 * | 9/2014 | Xia | ........................ G01V 1/282 702/11 |

(Continued)

OTHER PUBLICATIONS

Torii et al., "Application Seismic Interferometry to Natural Earthquakes Measured by Small-Scale Array", 2007, SEG Publication, p. 1362-1366 (Year: 2007).*

(Continued)

*Primary Examiner* — Elias Desta
(74) *Attorney, Agent, or Firm* — Conley Rose, P.C.

(57) ABSTRACT

A method for generating a high-resolution pseudo-reflectivity image of a subsurface region includes receiving seismic data associated with a subsurface region and captured by one or more seismic receivers, constructing a velocity model of the subsurface region based on the received seismic data, performing a seismic migration of the received seismic data based on the constructed velocity model to obtain migrated seismic data, computing polarized normal vectors associated with one or more subsurface reflectors of the subsurface region based on the migrated seismic data, and generating a pseudo-reflectivity image of the subsurface region based on both the computed polarized normal vectors.

21 Claims, 6 Drawing Sheets

(56) References Cited

U.S. PATENT DOCUMENTS 8,965,059 B2 * 2/2015 Winbow ............... G01V 1/282
382/109
2020/0124755 A1 4/2020 Sollner et al.

OTHER PUBLICATIONS

PCT/US2022/045738 International Search Report and Written Opinion dated Jan. 30, 2023 (12 p.).
Sena, Arcangelo G. et al., "Kirchhoff Migration and Velocity Analysis for Converted and Nonconverted Waves in Anisotropic Media," Geophysics, vol. 58, No. 2, Feb. 1993, pp. 265-276 (12 p.).
Zhang, Yu et al., "Amplitude-Preserving Reverse Time Migration: From Reflectivity to Velocity and Impedance Inversion," Geophysics, vol. 79, No. 6, Nov. 2014, pp. S271-S283 (13 p.).

* cited by examiner

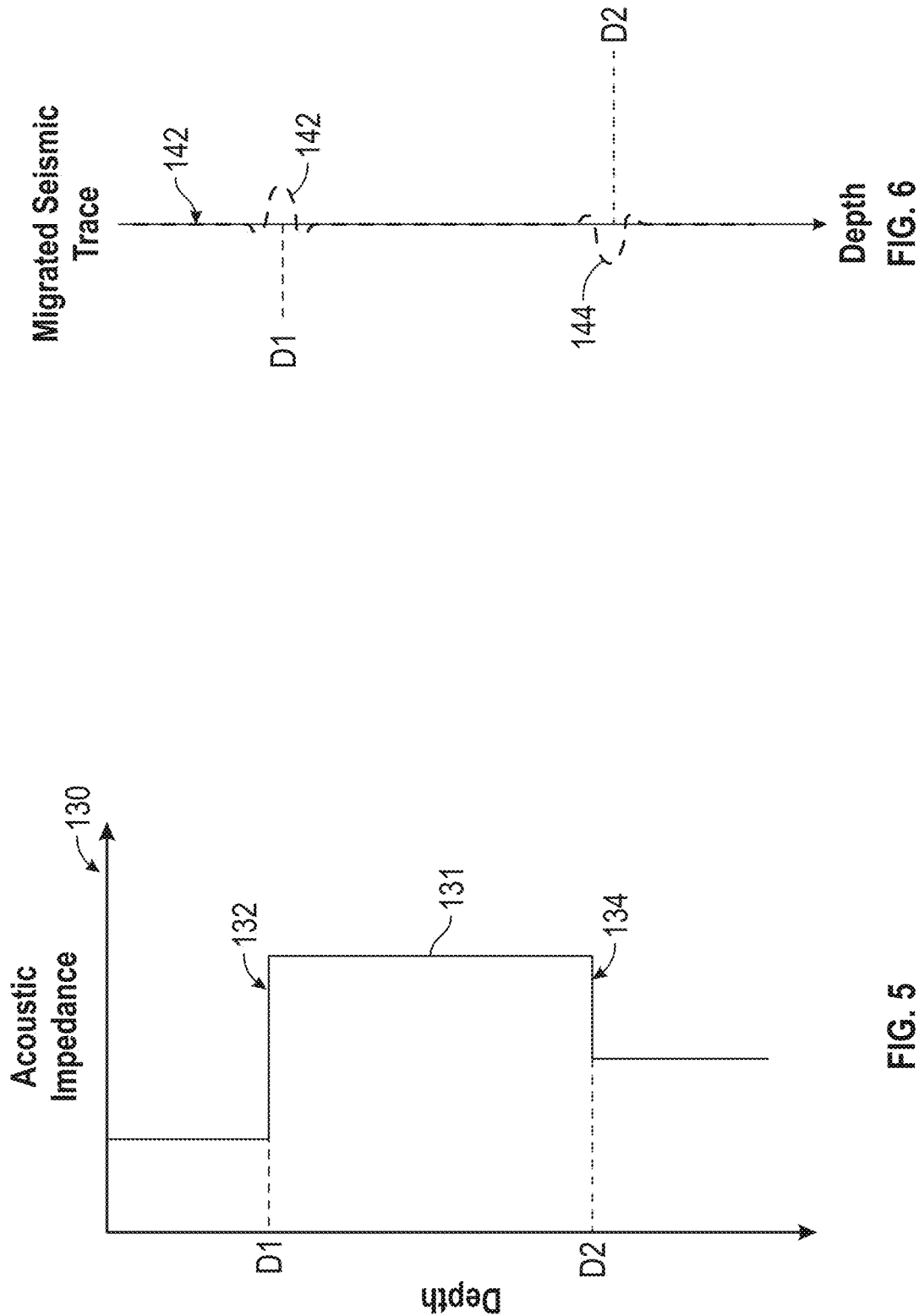

METHOD AND APPARATUS FOR IMPLEMENTING A HIGH-RESOLUTION SEISMIC PSEUDO-REFLECTIVITY IMAGE

CROSS-REFERENCE TO RELATED APPLICATIONS

This application claims benefit of U.S. provisional patent application Ser. No. 63/252,675 filed Oct. 6, 2021, and entitled "Method and Apparatus for Implementing a High-Resolution Seismic Pseudo-Reflectivity Image," which is hereby incorporated herein by reference in its entirety for all purposes.

STATEMENT REGARDING FEDERALLY SPONSORED RESEARCH OR DEVELOPMENT

Not applicable.

BACKGROUND

Seismic surveying is a method of exploration geophysics in which seismology is used to estimate properties of earthen subsurface regions from reflected seismic waves. Seismic surveying generally includes imparting acoustic or sound waves into a natural environment so that the waves enter the Earth and travel through a subsurface region of interest. As the seismic waves encounter an interface between two materials of the subsurface region, some of the wave energy is reflected off of the interface where the reflected wave energy may be recorded at the surface as seismic data associated with the subsurface region, while some of the wave energy refracts through the interface and penetrates deeper into the subsurface region. The reflected wave energy recorded at the surface as seismic data may be studied to ascertain information about the subsurface region. For example, the recorded seismic data may be used to construct an image of the subsurface region, and a velocity model of the subsurface region which models the velocity of the seismic waves passing through the subsurface region so as to translate subsurface reflection points of the seismic waves to their true depth within the formation.

SUMMARY

An embodiment of a method for generating a high-resolution pseudo-reflectivity image of a subsurface region comprises (a) receiving seismic data associated with a subsurface region and captured by one or more seismic receivers, (b) constructing a velocity model of the subsurface region based on the received seismic data, (c) performing a seismic migration of the received seismic data based on the constructed velocity model to obtain migrated seismic data, (d) computing normal vectors associated with one or more subsurface reflectors of the subsurface region based on the migrated seismic data, (e) computing a velocity gradient associated with the subsurface region based on the constructed velocity model, and (f) generating a pseudo-reflectivity image of the subsurface region based on both the computed normal vectors and the computed velocity gradient. In some embodiments, the migrated seismic data comprises a migration stack image of the subsurface region. In some embodiments, the migration stack image comprises a Kirchhoff migration stack image. In certain embodiments, the migration stack image comprises a Reverse-Time-Migration (RTM) image. In certain embodiments, the normal vectors each extend orthogonally with respect to one of the one or more subsurface reflectors. In some embodiments, the normal vectors comprise polarized normal vectors each having computed polarity. In some embodiments, (f) comprises combining the computed velocity gradient with the computed normal vectors. In certain embodiments, the seismic migration is performed at a first frequency to obtain a migration stack image, and wherein the first frequency corresponds to a maximum frequency of the migration stack image, and the pseudo-reflectivity image is generated at the first frequency, the first frequency corresponding to a maximum frequency of the pseudo-reflectivity image.

An embodiment of a method for generating a high-resolution pseudo-reflectivity image of a subsurface region comprises (a) receiving seismic data associated with a subsurface region and captured by one or more seismic receivers, (b) constructing a velocity model of the subsurface region based on the received seismic data, (c) performing a seismic migration of the received seismic data based on the constructed velocity model to obtain migrated seismic data, (d) computing polarized normal vectors associated with one or more subsurface reflectors of the subsurface region based on the migrated seismic data, and (e) generating a pseudo-reflectivity image of the subsurface region based on both the computed polarized normal vectors. In some embodiments, at least some of the polarized normal vectors have a negative polarity corresponding to local troughs in the migrated seismic data and at least some of the polarized normal vectors have a positive polarity corresponding to local peaks in the migrated seismic data. In some embodiments, (e) comprises combining the computed velocity gradient with the computed polarized normal vectors. In certain embodiments, combining the computed velocity gradient with the computed polarized normal vectors comprises taking the dot product of the computed velocity gradient and the computed polarized normal vectors. In certain embodiments, (b) comprises applying a Full Waveform Inversion (FWI) process on the received seismic data. In some embodiments, the migrated seismic data comprises a migration stack image of the subsurface region. In some embodiments, the method further comprises (f) computing a velocity gradient associated with the subsurface region based on the constructed velocity model. In some embodiments, the seismic migration is performed at a first frequency to obtain a migration stack image, and wherein the first frequency corresponds to a maximum frequency of the migration stack image, and the pseudo-reflectivity image is generated at the first frequency, the first frequency corresponding to a maximum frequency of the pseudo-reflectivity image.

An embodiment of a system for generating a high-resolution pseudo-reflectivity image of a subsurface region comprises a processor, a non-transitory memory, and an application stored in the non-transitory memory that, when executed by the processor receives seismic data associated with a subsurface region and captured by one or more seismic receivers, constructs a velocity model of the subsurface region based on the received seismic data, performs a seismic migration of the received seismic data based on the constructed velocity model to obtain migrated seismic data, computes polarized normal vectors associated with one or more subsurface reflectors of the subsurface region based on the migrated seismic data, computes a velocity gradient associated with the subsurface region based on the constructed velocity model, and generates a pseudo-reflectivity image of the subsurface region based on both the computed polarized normal vectors and the computed velocity gradient. In some embodiments, the seismic migration is performed at a first frequency to obtain a migration stack image, and wherein the first frequency corresponds to a maximum frequency of the migration stack image, and the pseudo-reflectivity image is generated at the first frequency, the first frequency corresponding to a maximum frequency of the pseudo-reflectivity image. In some embodiments, the normal vectors each extend orthogonally with respect to one of the one or more subsurface reflectors. In certain embodiments, the normal vectors comprise polarized normal vectors each having computed polarity. In certain embodiments, the application, when executed by the processor combines the computed velocity gradient with the computed normal vectors to generate the pseudo-reflectivity image.

BRIEF DESCRIPTION OF THE DRAWINGS

For a detailed description of various exemplary embodiments, reference will now be made to the accompanying drawings in which:

FIG. 5 is an exemplary graph depicting an estimated acoustic impedance of a subsurface region as a function of vertical depth;

FIG. 6 is an exemplary migrated seismic trace of captured seismic data; and

DETAILED DESCRIPTION

Figure 1:
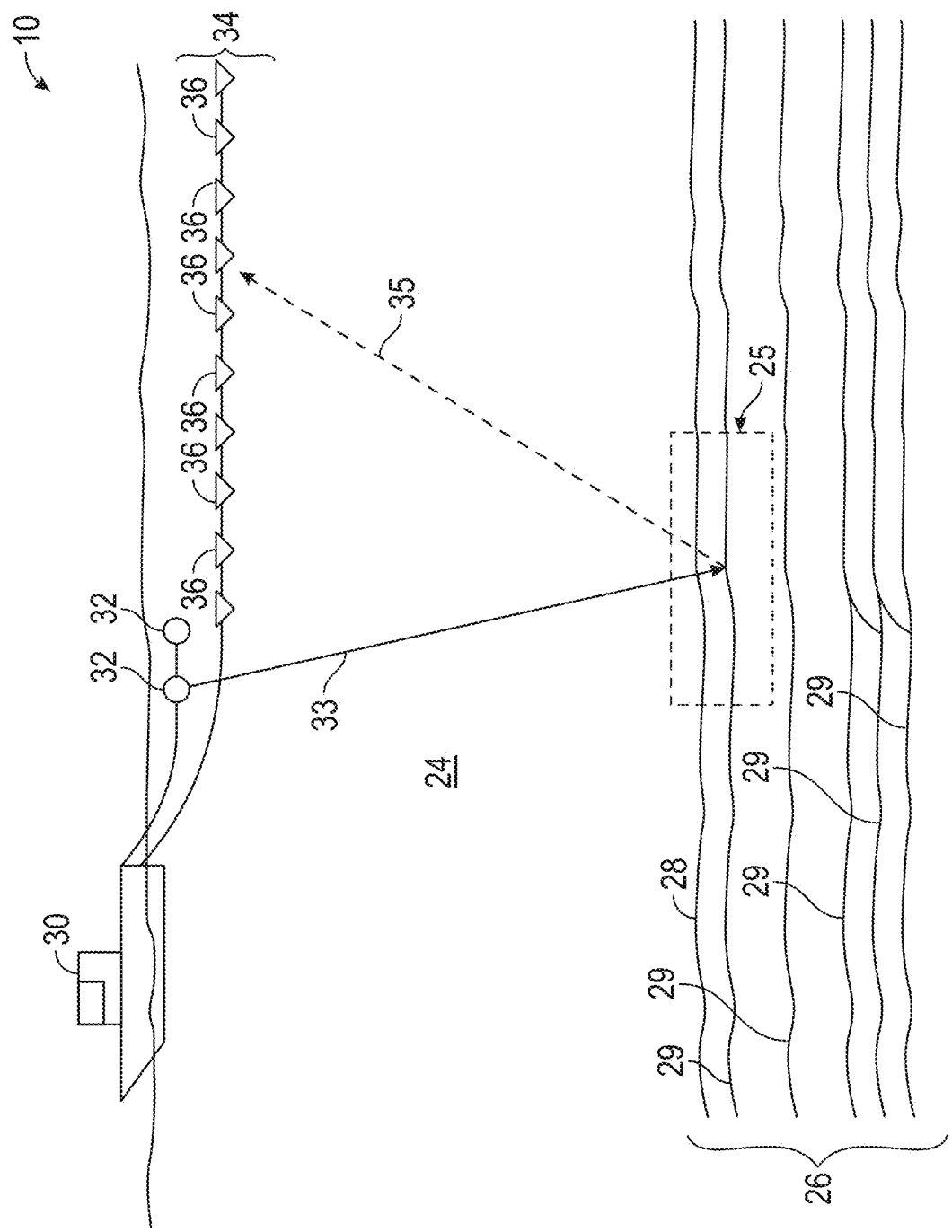
FIG. 1 is a schematic view of an embodiment of a system for performing a marine seismic survey.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, seismic surveys reflect seismic waves off of features of earthen subsurface regions in order to collect information regarding the subsurface regions. The information collected from the reflected seismic waves may be used to create velocity models and seismic images which may be used to identify subterranean features of interest such as, for example, hydrocarbon deposits.

As an example, in some applications an iterative data-fitting process such as an FWI process may be applied to the collected seismic data to form a velocity model therefrom. Typically, FWI processes for generating velocity models of subsurface regions includes comparing synthetic seismic information generated by an initial estimate of the velocity model with the collected seismic data to iteratively minimize an objective cost function. In addition to generating the velocity model, FWI processes may be applied to generate seismic images of the subsurface region sometimes referred to in the art as "pseudo-reflectivity images" where a velocity gradient is computed from the FWI-generated velocity model.

Such conventional pseudo-reflectivity images have certain advantages over other types of seismic images known in the art including so called "migration stack images" that are based on data that has been migrated in accordance with a seismic wave-equation migration process such as, for example, a Reverse Time Migration (RTM) migration process. As an example, given that FWI processes utilize the full wavefield in the development of seismic images of the subsurface region, pseudo-reflectivity images may offer greater illumination of certain types of subsurface structures contained in the subsurface region such as complex salt structures and the features hidden beneath salt structures. Conversely, conventional pseudo-reflectivity images, while offering relatively greater illumination of at least some complex subsurface structures compared to migration stack images, typically are at a disadvantage in terms of imaging resolution compared to migration stack images due at least in part to the excessively high costs associated with performing FWI processes at higher frequencies that border or overlap with the frequencies at which migration-based processes are performed. Specifically, FWI processes are typically conducted at relatively low frequencies (e.g., frequencies of 10 Hertz (Hz) or less for general production and particularly for exploration purposes) while migration-based processes are typically conducted at relatively high frequencies of 20 Hz or greater and even higher for other migration-based processes (e.g., 60 Hz or greater for Kirchhoff migration processes), resulting in frequency gap of 10 Hz or greater between these inversion-based and migration-based seismic imaging processes. Due to the limited resolution of conventional pseudo-reflectivity images, some of the fine details of subsurface structures contained within the imaged subsurface region may be lost, limiting the usefulness of conventional pseudo-reflectivity images in many applications.

Accordingly, embodiments of methods and apparatuses for generating high-resolution pseudo-reflectivity images of subsurface regions are described herein which combine both inversion-based and migration-based seismic imaging processes to produce pseudo-reflectivity images having both superior illumination as compared to migration stack images and superior resolution as compared to conventional pseudo-reflectivity images thereby eliminating the frequency gap present between migration stack images and conventional pseudo-reflectivity images. Particularly, embodiments of methods and apparatuses for generating high-resolution pseudo-reflectivity images of subsurface regions include constructing a velocity model of a subsurface region based on received seismic data, performing a seismic migration of the received seismic data based on the velocity model, computing polarized normal vectors associated with subsurface reflectors of the subsurface region, computing a velocity gradient of the subsurface region based on the velocity model, and generating one or more high-resolution pseudo-reflectivity images of the subsurface region based on the polarized normal vectors and the velocity gradient. It may be understood that the polarized normal vectors, which include information pertaining to their specific polarity, may be combined with the velocity gradient obtained from the velocity model in order to generate the high-resolution pseudo-reflectivity images.

Referring initially to FIG. 1, an embodiment of a marine survey system that may be employed to acquire seismic data (e.g., waveforms) regarding a subsurface region of the Earth in a marine environment. Generally, a marine seismic survey conducted using the marine survey system 10 shown in FIG. 1 may be conducted in an ocean 24 or other body of water over a subsurface region 26 of the Earth that lies beneath a seafloor 28. In this exemplary embodiment, marine survey system 10 generally includes a marine vessel 30, one or more seismic sources 32, a seismic streamer 34, one or more seismic receivers 36, and/or other equipment that may assist in acquiring seismic images representative of geological formations within the subsurface region 26 of the Earth.

The marine vessel 30 may tow the seismic sources 32 (e.g., an array of air guns) over an area of interest (AOI) 25 of the subsurface region as the seismic sources 32 repeatedly produce sound waves (e.g., emitted seismic waves indicated by arrow 33 in FIG. 1) that are directed at the seafloor 28 and towards the AOI 25. As the emitted seismic waves 33 penetrate through the subsurface region 26, some of the seismic energy of the seismic waves 33 is reflected off of one or more subsurface reflectors 29 formed within the subsurface region 26 such that the reflected seismic energy (e.g., reflected seismic waves indicated by arrow 35 in FIG. 1) travels towards the surface. Subsurface reflectors 29 of subsurface region 26 may comprise a variety of diverse geological features and formations including, for example, salt domes, faults, folds, and other features.

As the marine vessel 30 tows the seismic sources 32 over the AOI 25, the marine vessel 30 may concurrently tow the seismic receivers 36 (e.g., hydrophones) which capture the reflected seismic waves 35 that represent the energy output by the seismic sources 32 subsequent to being reflected off of the reflectors 29 within the subsurface region 26. The reflected seismic waves 35 captured by seismic receivers 36 comprises seismic data which may be processed by a computer system to generate one or more images and/or velocity models associated with the subsurface region 26. For example, images constructed from the captured seismic data may depict visually various features of the subsurface region 26 including at least some of reflectors 29 of the subsurface region 26. Additionally, velocity models constructed from the captured seismic data may be used to estimate the vertical depth (from the seafloor 28) of various features of the subsurface region 26 including at least some of the reflectors 29 thereof.

The images, velocity models, and other information gleaned from the captured seismic data may be utilized in locating hydrocarbon deposits within subsurface region 26. For example, the captured seismic data may be analyzed to generate a map or profile that illustrates various geological formations within the subsurface region 26. Based on the identified locations and properties of the hydrocarbon deposits determined from the captured seismic data, certain positions or parts (e.g., AOI 25) of the subsurface region 26 may be explored. That is, hydrocarbon exploration organizations may use the locations of the hydrocarbon deposits to determine locations at the surface (seafloor 28 in this exemplary embodiment) of the subsurface region 26 to drill into the Earth. As such, the hydrocarbon exploration organizations may use the locations and properties of the hydrocarbon deposits and the associated overburdens to determine a path along which to drill into the Earth, how to drill into the Earth, and the like. After exploration equipment has been placed within the subsurface region, the hydrocarbons that are stored in the identified hydrocarbon deposits may be produced via natural flowing wells, artificial lift wells, and the like.

It may be understood that the number of seismic sources 32 and the number of seismic receivers 36 of the marine survey system 10 may vary depending on the given application. In the same manner, although marine survey system 10 is described with one seismic streamer 34, it should be noted that the marine survey system 10 may include multiple streamers similar to streamer 34. Additionally, while seismic sources 32 are described as air guns and seismic receivers 36 are described as hydrophones in this exemplary embodiment, the configuration of sources 32 and receivers 36 may vary in other embodiments. Further, additional marine vessels 30 may include additional seismic sources 32, seismic streamers 34, and the like to perform the operations of the marine survey system 10.

Figure 2:
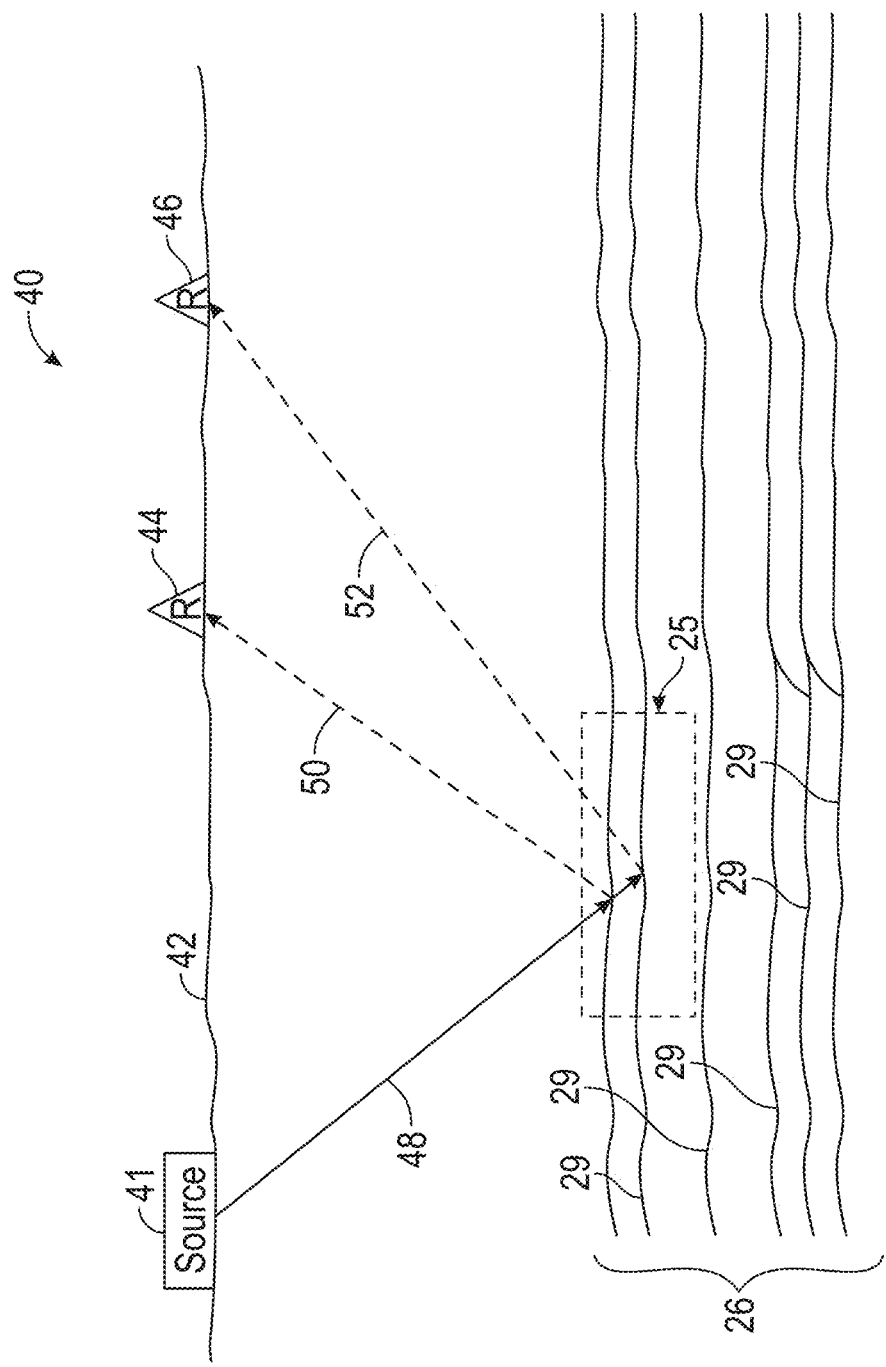
FIG. 2 is a schematic view of an embodiment of a system for performing a land-based seismic survey.

Referring now to FIG. 2, an embodiment of a land survey system 40 that may be employed to obtain information, including captured seismic data, regarding the subsurface region 26 of the Earth in a non-marine environment. In this exemplary embodiment, and survey system 40 generally includes a land-based seismic source 41 and land-based receiver 44. In some embodiments, the land survey system 40 may include multiple land-based seismic sources 40 and one or more land-based receivers 44 and 46. Indeed, for discussion purposes, the land survey system 40 includes a land-based seismic source 41 and two land-based receivers 44 and 46.

The land-based seismic source 41 (e.g., a seismic vibrator) of land survey system 40 may be disposed on a surface 42 of the Earth above the subsurface region 26 of interest. The land-based seismic source 41 may produce energy (e.g., emitted seismic waves indicated by arrow 48 in FIG. 2) that is directed at the subsurface region 26 of the Earth. Upon reaching various subsurface reflectors 29 (e.g., salt domes, faults, folds) within the subsurface region 26, the energy output by the land-based seismic source 41 may be reflected (e.g., reflected seismic waves indicated by arrows 50 and 52 in FIG. 2) off of the subsurface reflectors 29, and captured by one or more land-based seismic receivers (e.g., seismic receivers 44 and 46).

In some embodiments, the land-based seismic receivers 44 and 46 may be dispersed across the surface 42 of the Earth to form a grid-like pattern. As such, each land-based seismic receiver 44 or 46 may receive a reflected seismic wave 50 or 52 in response to energy being directed at the subsurface region 26 via the seismic source 41. In some cases, one seismic waveform produced by the seismic source 41 may be reflected off of different subsurface reflectors 29 and received by different seismic receivers 44 and 46. For example, as shown in FIG. 2, a first seismic receiver 44 may receive the reflection of the emitted seismic wave 48 off of a first reflector 29 while a second seismic receiver 46 may receive the reflection of the seismic waveform 48 off of a second reflector 29. As such, the first seismic receiver 44 may receive a reflected seismic wave 50 and the second seismic receiver 46 may receive a reflected seismic wave 52.

Figure 3:
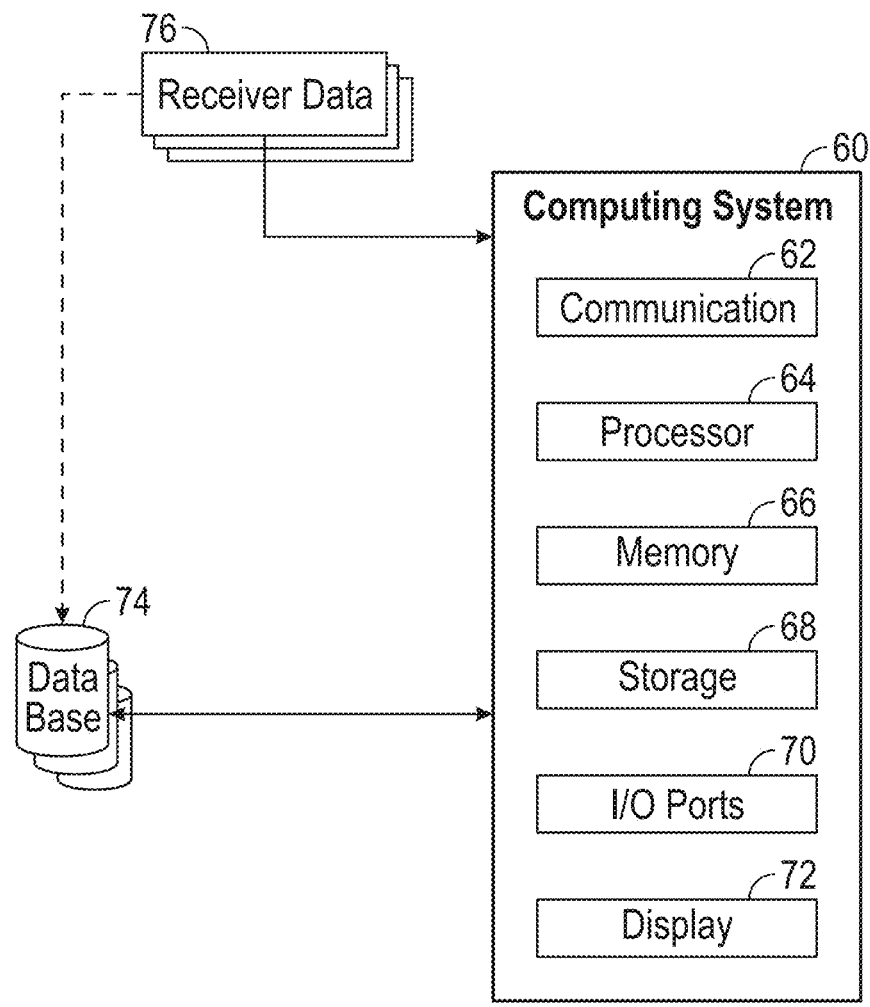
FIG. 3 is a block diagram of an embodiment of a computer system.

Regardless of how the seismic data is acquired, a computer system may analyze the seismic waveforms acquired by the seismic receivers (e.g., seismic receivers 36, 44, and 46 of survey systems 10 and 40 described above) to determine seismic information regarding the geological structure, the location and property of hydrocarbon deposits, and the like within the subsurface region 26. Referring now to FIG. 3, a block diagram of an embodiment of such a computer system 60 that may perform various data analysis operations to analyze the seismic data acquired by the receivers 36, 44, 46 to determine the structure and/or predict seismic properties of the geological formations within the subsurface region 26.

In this exemplary embodiment, computer system 60 generally includes a communication component 62, a processor 64, memory 66, storage 68, input/output (I/O) ports 70, and a display 72. In some embodiments, the computer system 60 may omit one or more of the display 72, the communication component 62, and/or the (I/O) ports 70. The communication component 62 may be a wireless or wired communication component that may facilitate communication between the seismic receivers (e.g., seismic receivers 36, 44, and 46), one or more databases 74, other computing devices, and/or other communication capable devices. In one embodiment, the computer system 60 may receive receiver data 76 (e.g., captured seismic data, seismograms, etc.) via a network component, databases 74, or the like. The processor 64 of the computer system 60 may execute instructions stored on the memory 66 to analyze or process the receiver data 76 to ascertain various features regarding geological formations within the subsurface region 26. As will be discussed further herein, processor 64 may particularly execute instructions stored on memory 66 to construct one or more images and/or one or more velocity models of the subsurface region 26.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also be used to store the data, analysis of the data, the software applications, and the like. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. I/O ports 70 may enable the computer system 60 to communicate with the other devices in the marine survey system 10, the land survey system 40, or the like via the I/O ports 70.

The display 72 may depict visualizations associated with software or executable code being processed by the processor 64. In one embodiment, the display 72 may be a touch display capable of receiving inputs from a user of the computer system 60. The display 72 may also be used to view and analyze results of the analysis of the acquired seismic data to determine the geological formations within the subsurface region 26, the location and property of hydrocarbon deposits within the subsurface region 26, predictions of seismic properties associated with one or more wells in the subsurface region 26, and the like. The display 72 may be any suitable type of display, such as a liquid crystal display (LCD), plasma display, or an organic light emitting diode (OLED) display, for example. In addition to depicting the visualization described herein via the display 72, it should be noted that the computer system 60 may also depict the visualization via other tangible elements, such as paper (e.g., via printing) and the like.

With the foregoing in mind, the present techniques described herein may also be performed using a supercomputer that employs multiple computer systems 60, a cloud-based computer system, or the like to distribute processes to be performed across multiple computer systems 60. In this case, each computer system 60 operating as part of a supercomputer may not include each component listed as part of the computer system 60. For example, each computer system 60 may not include the display 72 since multiple displays 72 may not be useful to for a supercomputer designed to continuously process seismic data.

After performing various types of seismic data processing, the computer system 60 may store the results of the analysis in one or more databases 74. The databases 74 may be communicatively coupled to a network (e.g., a wide area network like the Internet) that may transmit and receive data to and from the computer system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computer system 60, it should be noted that similar components may make up the computer system 60. Moreover, the computer system 60 may also be part of the marine survey system 10 and/or the land survey system 40, and thus may monitor and control certain operations of the seismic sources 32 or 40, the seismic receivers 36, 44, 46, and the like. Further, it should be noted that the listed components are provided as example components and the embodiments described herein are not to be limited to the components described with reference to FIG. 3.

In some embodiments, the computer system 60 may generate a two-dimensional representation or a three-dimensional representation of the subsurface region 26 based on the seismic data received via the receivers mentioned above.

Additionally, seismic data associated with multiple seismic source/receiver combinations may be combined to create a near continuous profile of the subsurface region 26 that can extend for some distance. In a two-dimensional (2D) seismic survey, the receiver locations may be placed along a single line, whereas in a three-dimensional (3D) survey the receiver locations may be distributed across the surface in a grid pattern. As such, a 2D seismic survey may provide a cross sectional picture (vertical slice) of the Earth layers as they exist directly beneath the recording locations. A 3D seismic survey, on the other hand, may create a data "cube" or volume that may correspond to a 3D picture of the subsurface region 26. In either case, a seismic survey may be composed of a very large number of individual seismic recordings or traces. As such, the computer system 60 may be employed to analyze the acquired seismic data to obtain an image representative of the subsurface region 26 and, using the obtained image, determine locations and properties of desired hydrocarbon deposits within the subsurface region 26 which may be later extracted. To that end, a variety of seismic data processing algorithms may be used to remove noise from the acquired seismic data, migrate the pre-processed seismic data, identify shifts between multiple seismic images, align multiple seismic images, and the like.

Figure 4:
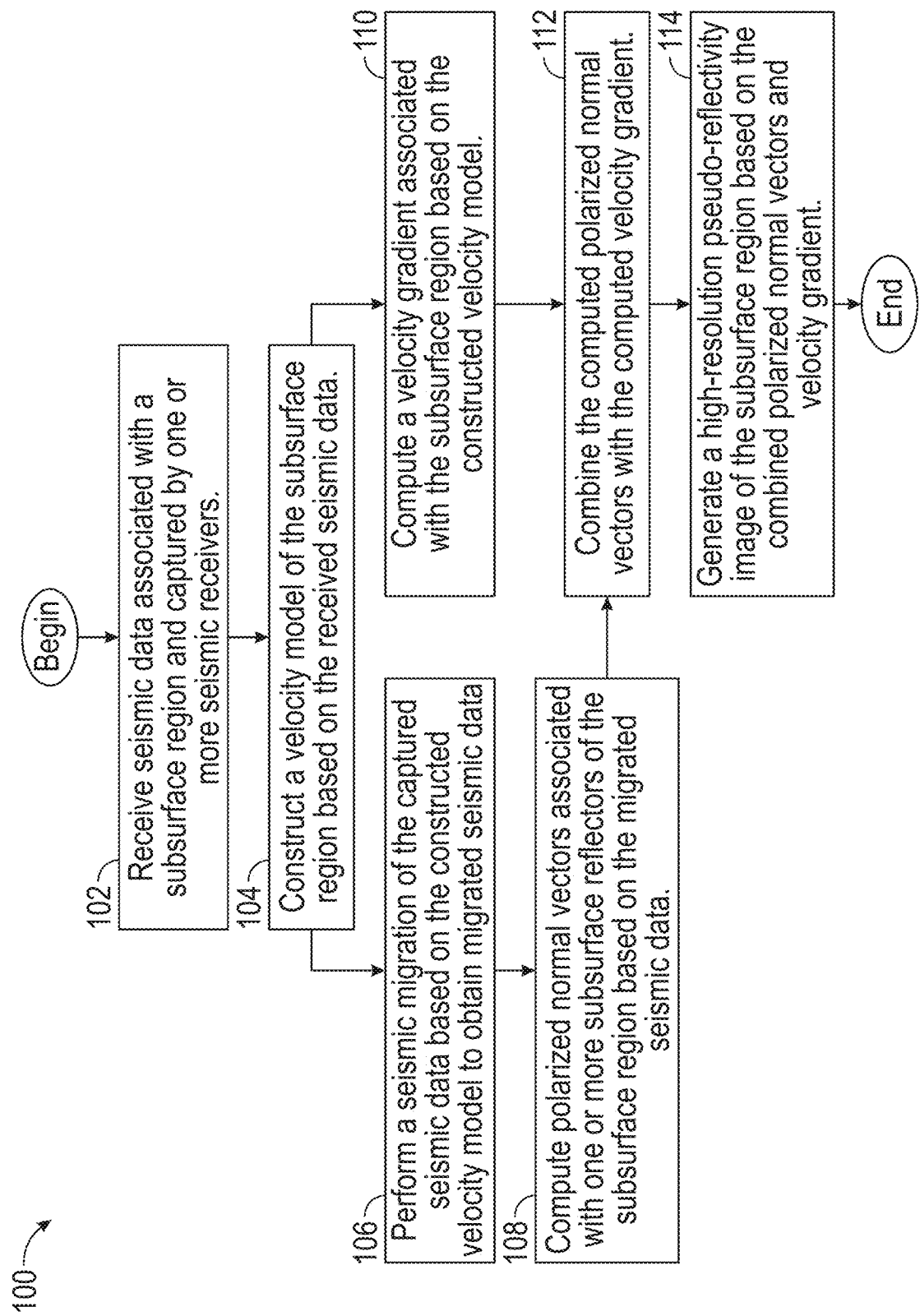
FIG. 4 is a flowchart illustrating an embodiment of a method for generating high-resolution pseudo-reflectivity images of subsurface regions.

Referring now to FIG. 4, an embodiment of a method 100 for generating a high-resolution pseudo-reflectivity image of a subsurface region is shown. At least some, if not all, of the steps or "blocks" of method 100 shown in FIG. 4 may be executed by the computer system 60 shown in FIG. 3, although it may be understood that at least some of the steps of method 100 may be executed by systems other than computer system 60. Additionally, it may be understood that the high-resolution pseudo-reflectivity images constructed using method 100 may be utilized for a variety of purposes, including identifying locations and properties of desired hydrocarbon deposits within the subsurface region which may be extracted later using information contained in the pseudo-reflectivity image.

Beginning at block 102, method 100 includes receiving seismic data associated with a subsurface region (e.g., subsurface region 26) and captured by one or more seismic receivers (e.g., seismic receivers 36, 44, and 46). The seismic data received at block 102 comprises reflected seismic data that, after being emitted from a seismic source (e.g., seismic sources 32 and 41), is reflected off of subsurface reflectors (e.g., subsurface reflectors 29) formed in the subsurface region.

At block 104, method 100 includes constructing a velocity model of the subsurface region based on the received seismic data. The velocity model may model the interval velocity of the subsurface region thereby translating the time-domain seismic data into depth-domain data. In some embodiments, the process of constructing the velocity model at block 104 may be performed at a velocity model frequency. The velocity model frequency may define an upper-bound or maximum frequency of a conventional pseudo-reflectivity generated from the constructed velocity model. Due to associated costs and other reasons, the velocity model frequency may be relatively low (e.g., less than 10 Hz). In some embodiments, block 104 comprises applying a full waveform inversion (FWI) process to construct the velocity model of the subsurface region. Particularly, the FWI process applied at block 104 may comprise an iterative data-fitting process in which an initial velocity model of the subsurface region is constructed from which synthetic, modeled seismic data may be generated. In other embodiments, processes other than FWI may be used to construct the velocity model at block 104. For example, tomography, velocity scanning techniques, manual editing, and scenario testing and/or other processes beyond FWI may be utilized for constructing the velocity model at block 104.

As part of the FWI process, the modeled seismic data created from the initial velocity model may be compared to the received seismic data using an objective function which describes the degree of concordance between the modeled seismic data and the received seismic data. Parameters of the initial velocity model may then be updated based on the comparison between the modeled seismic data and the received seismic data in an effort to reduce or minimize the objective function, thereby forming a revised velocity model. Modeled seismic data may again be generated this time from the revised velocity model and compared with the received seismic data to further minimize the objective function. This process may be repeated iteratively until a global minimum of the objective function has been obtained corresponding to a final velocity model of the subsurface region.

Referring briefly to FIG. 5, an exemplary acoustic impedance graph 130 is shown depicting an estimated acoustic impedance 131 of a subsurface region (e.g., subsurface region 26) as a function of vertical depth. Acoustic impedance graph 130 may be generated by or otherwise comprise a product of the velocity model constructed at bock 104 of method 100. In this example, the estimated acoustic impedance 131 of the subsurface region includes a rapid increase or spike in acoustic impedance indicated by arrow 132 at a first depth (D1) followed by a rapid decrease or drop in acoustic impedance indicated by arrow 134 at a second depth (D2) that is greater than the first depth D1. The increase in acoustic impedance 131 which occurs between spike 132 and drop 134 may correspond to the presence of a high-impedance layer within the subsurface region extending between depths D1 and D2 such as the presence of a salt structure having a vertical top located at depth D1 and an opposing vertical bottom located at a depth D2. Acoustic impedance graph 130 thus indicates how the velocity model constructed at block 104 of method 100 may be utilized to identify or map structures formed within a subsurface region as a function of depth.

Referring again to FIG. 4, at block 106, method 100 comprises performing a seismic migration of the captured seismic data based on the constructed velocity model to obtain migrated seismic data. In some embodiments, the process of performing the seismic migration at block 104 may be performed at a migration frequency. The migration frequency may define an upper-bound or maximum frequency of a migration stack image generated from the performance of the seismic migration at block 104 and which may correspond to the migrated seismic data obtained at block 104. The migration frequency is typically greater than the velocity model frequency (potentially substantially greater depending on the technique chosen for constructing the velocity model and the technique chosen for performing the seismic migration). In some embodiments, the migration frequency may be at least 10 Hz greater than the velocity model frequency. In certain embodiments, the migration frequency may be at least 30 Hz greater than the velocity model frequency. In certain embodiments, the migration frequency may be at least 50 Hz greater than the velocity model frequency.

In some embodiments, block 106 comprises applying a wave-equation migration process to obtain the migrated seismic data such as RTM process, a one-way wave-equation migration (WEM) process, a Kirchhoff depth migration process, and the like or combinations thereof. For example, in an embodiment, a RTM migration progress may be employed at block 106 to obtain migrated seismic data in the form of a migration stack image of the subsurface region. The RTM depth migration process may generally include propagating seismic source and seismic receiver wavefields to potential subsurface reflectors in the subsurface region using the wave equation, and generating an image (e.g., a RTM migration stack image) using the velocity model constructed at block 104. Alternatively, a velocity model of the subsurface region other than the velocity model constructed at block 104 may be utilized in the RTM process to form the RTM migration stack image.

Referring briefly to FIG. 6, an exemplary migrated seismic trace 140 of captured seismic data is shown that extends along an axis corresponding to vertical depth of a subsurface region (e.g., subsurface region 26). Migrated seismic trace 140 may comprise migrated seismic data obtained at block 106 of method 100. In this example, migrated seismic trace 140 is associated with the exemplary acoustic impedance graph 130 shown in FIG. 5 illustrating information captured by graph 130 following migration of the captured seismic data.

In this example, migrated seismic trace 140 includes a first deviation in the form of a peak (indicated by arrow 142 in FIG. 6) located at depth D1, and a second deviation in the form of a trough (indicated by arrow 144 in FIG. 6) located at depth D2. Peak 142 indicates the presence of a first subsurface reflector at depth D1 such as, for example, the top of a salt structure located at depth D1 in the subsurface region. Thus, peak 142 of migrated seismic trace 140 corresponds to the spike 132 in the acoustic impedance 132 illustrated in graph 130 of FIG. 5 and thus is indicative of a spike in acoustic impedance of the subsurface region at depth D1. Similarly, trough 144 indicates the presence of a second subsurface reflector at depth D2 such as, for example, the bottom of a salt structure located at depth D2 in the subsurface region. However, the polarity of trough 144 is opposite that of the polarity of peak 142, and thus trough 144 is indicative of a drop in acoustic impedance of the subsurface region at depth D2. As discussed further below, the opposing polarity of peak 142 and trough 144 may be depicted visually as part of a migration stack image with peak 142 (and other peaks of migrated seismic trace 140 not shown in FIG. 6) indicated by dark traces of the migration stack image while trough 144 (and other troughs of migrated seismic trace 140 not shown in FIG. 6) indicated by a light traces of the migration stack image.

Referring again to FIG. 4, at block 108, method 100 comprises computing a polarized normal vector associated with one or more subsurface reflectors of the subsurface region based on the migrated seismic data. In certain embodiments, block 108 of method 100 comprises computing a polarized normal vector based on a migration stack image, such as a migration stack image generated from a RTM migration process as discussed above. For example, and referring now to FIGS. 4 and 7, an exemplary migration stack image 150 generated by a migration process (e.g., a RTM process) is shown in FIG. 7 having a Y-axis that corresponds to vertical depth and an X-axis corresponding to lateral extension in the X-dimension (e.g., extending in a plane containing the seismic source(s) and seismic receiver (s)).

Migration stack image 150 contains a plurality of artifacts or "ripples" (a few of which are indicated by arrows 151-156 in FIG. 7) which correspond to subsurface reflectors (e.g., subsurface reflectors 29) of the subsurface region (e.g., subsurface region 26) captured by the received seismic data and depicted visually in migration stack image 150 as alternating "light" and "dark" traces which extend from the left side of image 150 towards the right side of image 150 (e.g., extending along the X-axis of image 150). For instance, subsurface reflector 151 is indicated as a dark trace or line extending across image 150 while subsurface reflector 152 is indicated as a light trace or line that is directly adjacent or "sandwiched" against the subsurface reflector 151 positioned directly above. Subsurface reflectors 153/154 and reflectors 155/156 are similarly sandwiched together at other locations within the depth migration stack image 150. Whether a subsurface reflector is a "dark" trace or a "light" trace depends on the change in acoustic impedance registered by the trace where dark traces are associated with an increase in acoustic impedance at a given depth associated with the dark trace while light traces are associated with a decrease in acoustic impedance at a given depth associated with the light trace. It may be understood that the dark traces of migration stack image 150 correspond to peaks in a migrated seismic trace (e.g., peak 142 of the migrated seismic trace 140 shown in FIG. 6) while light traces of migration stack image 150 may correspond to troughs in a migrated seismic trace (e.g., trough 144 of the migrated seismic trace 140). Rapid flipping between "dark" and "light" traces/reflectors in depth migration stack image 150 indicates the presence of relatively fine subsurface layers at that particular location within the subsurface region while relatively sparse flipping between "dark" and "light" traces/ reflectors in image 150 indicates the presence of relatively thick subsurface layers at that particular location.

Figure 7:
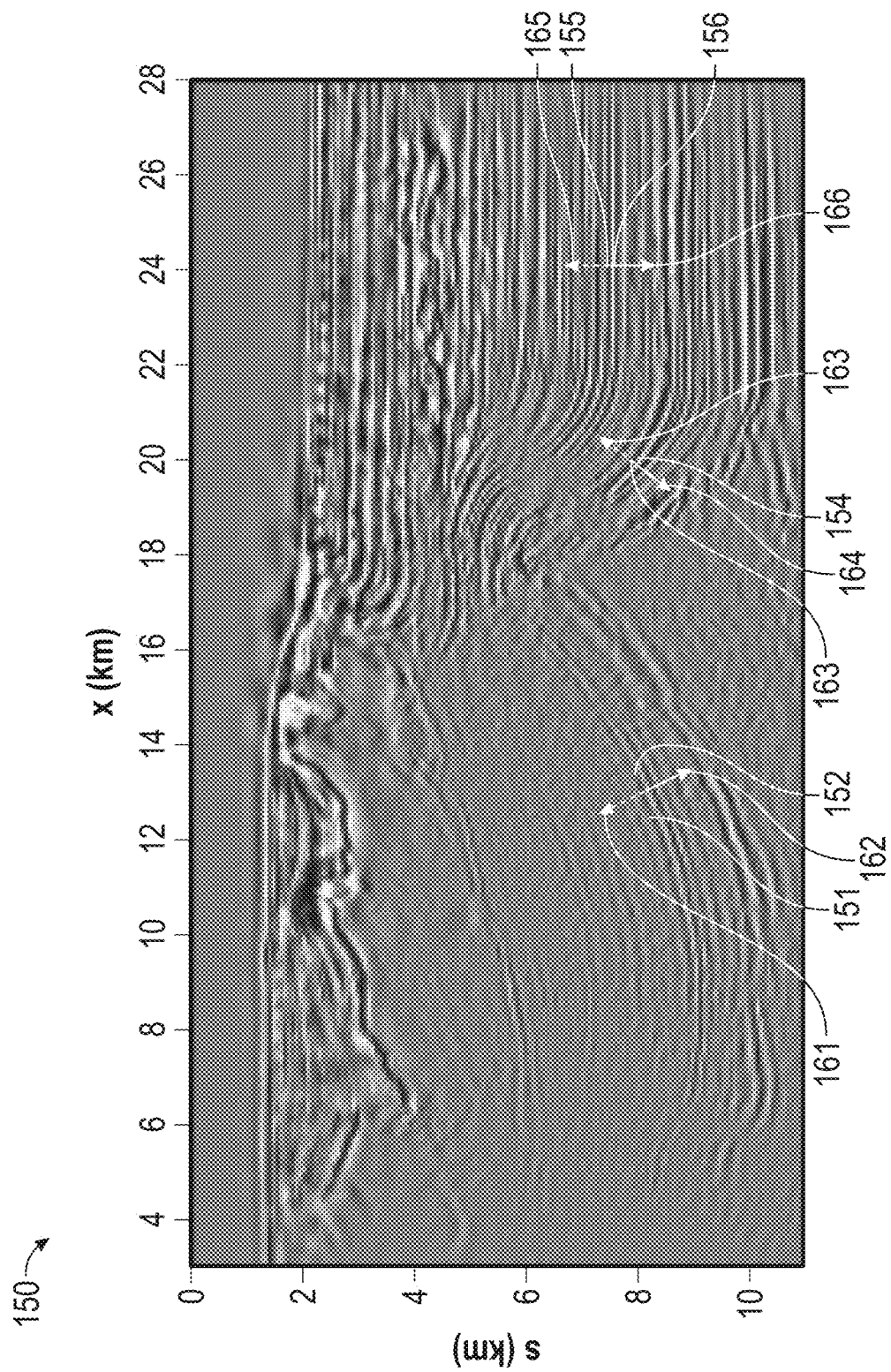
FIG. 7 is an example of a migration stack image of a subsurface region.

In this example, the polarized normal vectors computed at block 108 correspond to the vectors that extend normally or orthogonally from the subsurface reflectors captured within the depth migration stack image 150, including the subsurface reflectors 151-156 indicated in FIG. 7. Additionally, each normal vector has a corresponding polarity that indicates in which of the two orthogonal directions the given normal vector extends. The polarity of a given vector is dependent on whether the subsurface reflector associated with the given is a "dark" trace (e.g., reflectors 151, 153, and 155) or a "light" trace (e.g., reflectors 152, 154, and 156) in the depth migration stack image 150. In other words, traces located in the depth migration stack image 150 which correspond to local peaks in the seismic waveform are assigned a first polarity while traces in the image 150 which correspond to local troughs in the seismic waveform are assigned a second, opposing polarity. The depth migration stack image 150 shown in FIG. 7 is annotated to indicate positively polarized normal vectors 161, 163, and 165 which are associated with reflectors 151, 153, and 155, respectively. Depth migration stack image 150 is additionally annotated to indicate "negatively" polarized normal vectors 162, 164, and 166 associated with reflectors 152, 154, and 156, respectively. Thus, as used herein, the term "polarized normal vectors" refer to normal vectors which include information relating to their respective polarity.

While depth migration stack image 150 is annotated to indicate but a few subsurface reflectors 151-156 and their corresponding computed polarized normal vectors 161-166, it may be understood that at block 108 of method 100 polarized normal vectors may be computed for each of the traces visually indicated in the depth migration stack image 150.

At block 110, method 100 includes computing a velocity gradient or derivative associated with the subsurface region based on the velocity model constructed at block 104. In some embodiments, block 110 includes computing the velocity derivatives of the subsurface region from the velocities of the subsurface region estimated by the velocity model constructed at block 104. At block 112, method 100 includes combining the polarized normal vectors computed at block 108 with the velocity gradient computed at block 110. In some embodiments, block 112 includes taking the dot product of the polarized normal vectors with the velocity gradient to thereby combine the polarized normal vectors with the velocity gradient.

At block 114, method 100 includes generating a high-resolution pseudo-reflectivity image of the subsurface region based on the polarized normal vectors and velocity gradient combined at block 112. It may be understood that the polarity of the normal vectors encodes the frequency information of the migration stack image from which these normal vectors are computed. When combining with the velocity gradient, this additional frequency information results in the generation of a high-resolution pseudo-reflectivity image. In some embodiments, the high-resolution pseudo-reflectivity image has a resolution comparable to the migration stack image (e.g., a migration stack image generated at block 106) used in generating the pseudo-reflectivity image. In some embodiments, the process of generating the high-resolution pseudo-reflectivity image at block 114 may be performed at the migration frequency or a frequency comparable to the migration frequency. The migration frequency may thus define an upper-bound or maximum frequency of the pseudo-reflectivity image generated at block 114 where, as described above, the migration frequency is greater than the velocity model frequency. As an example, the high-resolution pseudo-reflectivity image has a resolution of 20-30 Hz or more when an RTM process is utilized for performing the seismic migration at block 106. Alternatively, the high-resolution pseudo-reflectivity image may have a frequency of 60 Hz or more when a Kirchhoff process is utilized for performing the seismic migration at block 106. By contrast, conventional pseudo-reflectivity images based on low-frequency FWI processes typically only has a resolution of 10 Hz or less.

It may be generally understood that in other embodiments of methods for generating a high-resolution pseudo-reflectivity image of a subsurface region may vary from the exact sequence of steps shown in FIG. 4. For example, in other embodiments, only some of the blocks 102-114 may be performed in generating a high-resolution pseudo-reflectivity image while in other embodiments additional steps not shown in FIG. 4 may be performed when generating high-resolution pseudo-reflectivity images.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for generating a high-resolution pseudo-reflectivity image of a subsurface region, the method comprising:
    (a) receiving seismic data associated with a subsurface region and captured by one or more seismic receivers;
    (b) constructing a velocity model of the subsurface region based on the received seismic data;
    (c) performing a seismic migration of the received seismic data based on the constructed velocity model to obtain migrated seismic data;
    (d) computing normal vectors associated with one or more subsurface reflectors of the subsurface region based on the migrated seismic data;
    (e) computing a velocity gradient associated with the subsurface region based on the constructed velocity model; and
    (f) generating a pseudo-reflectivity image of the subsurface region based on both the computed normal vectors and the computed velocity gradient.

2. The method of claim 1, wherein the migrated seismic data comprises a migration stack image of the subsurface region.

3. The method of claim 2, wherein the migration stack image comprises a Kirchhoff migration stack image.

4. The method of claim 2, wherein the migration stack image comprises a Reverse-Time-Migration (RTM) image.

5. The method of claim 1, wherein the normal vectors each extend orthogonally with respect to one of the one or more subsurface reflectors.

6. The method of claim 1, wherein the normal vectors comprise polarized normal vectors each having computed polarity.

7. The method of claim 1, wherein (f) comprises combining the computed velocity gradient with the computed normal vectors.

8. The method of claim 1, wherein:
    the seismic migration is performed at a first frequency to obtain a migration stack image, and wherein the first frequency corresponds to a maximum frequency of the migration stack image; and
    the pseudo-reflectivity image is generated at the first frequency, the first frequency corresponding to a maximum frequency of the pseudo-reflectivity image.

9. A method for generating a high-resolution pseudo-reflectivity image of a subsurface region, the method comprising:
    (a) receiving seismic data associated with a subsurface region and captured by one or more seismic receivers;
    (b) constructing a velocity model of the subsurface region based on the received seismic data;
    (c) performing a seismic migration of the received seismic data based on the constructed velocity model to obtain migrated seismic data;
    (d) computing polarized normal vectors associated with one or more subsurface reflectors of the subsurface region based on the migrated seismic data; and
    (e) generating a pseudo-reflectivity image of the subsurface region based on both the computed polarized normal vectors.

10. The method of claim 9, wherein at least some of the polarized normal vectors have a negative polarity corresponding to local troughs in the migrated seismic data and at least some of the polarized normal vectors have a positive polarity corresponding to local peaks in the migrated seismic data.

11. The method of claim 9, wherein (e) comprises combining the computed velocity gradient with the computed polarized normal vectors.

12. The method of claim 11, wherein combining the computed velocity gradient with the computed polarized normal vectors comprises taking the dot product of the computed velocity gradient and the computed polarized normal vectors.

13. The method of claim 9, wherein (b) comprises applying a Full Waveform Inversion (FWI) process on the received seismic data.

14. The method of claim 9, wherein the migrated seismic data comprises a migration stack image of the subsurface region.

15. The method of claim 9, further comprising:
(f) computing a velocity gradient associated with the subsurface region based on the constructed velocity model.

16. The method of claim 9, wherein:
the seismic migration is performed at a first frequency to obtain a migration stack image, and wherein the first frequency corresponds to a maximum frequency of the migration stack image; and
the pseudo-reflectivity image is generated at the first frequency, the first frequency corresponding to a maximum frequency of the pseudo-reflectivity image.

17. A system for generating a high-resolution pseudo-reflectivity image of a subsurface region, the system comprising:
a processor;
a non-transitory memory; and
an application stored in the non-transitory memory that, when executed by the processor:
receives seismic data associated with a subsurface region and captured by one or more seismic receivers;
constructs a velocity model of the subsurface region based on the received seismic data;
performs a seismic migration of the received seismic data based on the constructed velocity model to obtain migrated seismic data;
computes polarized normal vectors associated with one or more subsurface reflectors of the subsurface region based on the migrated seismic data;
computes a velocity gradient associated with the subsurface region based on the constructed velocity model; and
generates a pseudo-reflectivity image of the subsurface region based on both the computed polarized normal vectors and the computed velocity gradient.

18. The system of claim 17, wherein:
the seismic migration is performed at a first frequency to obtain a migration stack image, and wherein the first frequency corresponds to a maximum frequency of the migration stack image; and
the pseudo-reflectivity image is generated at the first frequency, the first frequency corresponding to a maximum frequency of the pseudo-reflectivity image.

19. The system of claim 17, wherein the normal vectors each extend orthogonally with respect to one of the one or more subsurface reflectors.

20. The system of claim 17, wherein the normal vectors comprise polarized normal vectors each having computed polarity.

21. The system of claim 17, wherein the application, when executed by the processor:
combines the computed velocity gradient with the computed normal vectors to generate the pseudo-reflectivity image.

* * * * *